Patented Oct. 29, 1946

2,410,108

UNITED STATES PATENT OFFICE 2,410,108

ALKYLATION

Alexander N. Sachanen and Arlie A. O'Kelly, Woodbury, N. J., and Claude G. Myers, Bryn Mawr, Pa., assignors to Socony-Vacuum Oil Company, Incorporated, a corporation of New York No Drawing. Application September 15, 1944, Serial No. 554,342

20 Claims. (Cl. 260—683.4)

This invention relates generally, to the alkylation of paraffinic hydrocarbons with olefinic hydrocarbons, and is more particularly concerned with the production of high-octane motor fuel by the catalytic alkylation of paraffinic hydrocarbons with olefinic hydrocarbons.

It is well known in the art to polymerize olefinic hydrocarbon gases to produce motor fuels having constituents of an unsaturated character. Various commercial processes have been proposed for ultimately effecting the desired polymerization of the olefinic hydrocarbons. These processes have been predicated upon the dictates of the chemical nature of the stocks available, as well as engineering considerations such as initial and operation costs; their essential feature being that in the course of treating the materials, the olefinic hydrocarbons produced in the earlier stages of the process, are eventually polymerized into hydrocarbons boiling within the gasoline boiling range. Accordingly, hydrocarbon gases may be passed along with cracking stock or naphtha through a cracking still to crack and polymerize such gases to gasoline simultaneously with the cracking or reforming, or paraffinic hydrocarbon gases may be separately cracked into olefinic hydrocarbon gases and these gases are subsequently passed with naphtha through a polymerizing and reforming still. In some instances, the processes involve the use of catalysts for facilitating the cracking and/or polymerization operations.

It is also well known in the art, to combine paraffinic hydrocarbons directly with olefinic hydrocarbons by processes broadly called alkylation processes, to produce motor fuels having constituents of saturated character. In alkylation processes, a charge comprising a mixture of a paraffinic hydrocarbon, called the paraffinic reactant, and an olefinic hydrocarbon, called the olefinic reactant, is subjected to high temperature and pressure to produce a saturated alkylate product. Since conditions of alkylation also cause polymerization of the olefinic reactant, it is necessary to maintain a relatively low concentration of the olefinic reactant in the charge. The only limit to the pressure used appears to be the feasibility of maintaining high pressures. On the other hand, the temperature used is limited by degradation of the hydrocarbon reactants in the charge to low molecular weight hydrocarbons, and the occurrence of side reactions, including polymerization of the olefinic reactant, under high temperature conditions, that substantially reduce the purity of the product obtained.

The temperatures and to a certain extent, the pressures employed in alkylation operations, depend upon whether the alkylation is effected in the absence or presence of alkylation catalysts. The two methods are generally referred to as thermal and catalytic alkylation, respectively. As is well known in the art, thermal alkylation ordinarily involves the use of temperatures of at least about 900° F. and pressures of the order of 4000 pounds per square inch or higher. At these temperatures, the degradation of the hydrocarbon reactants in the charge, and the occurrence of side reactions, including polymerization of the olefinic reactant, is somewhat marked. On the other hand, catalytic alkylation involves the use of appreciably lower temperatures, thereby assuring a high yield of desired alkylate by avoiding extensive degradation of the reactants, the occurrence of secondary reactions, and appreciable polymerization of the olefinic reactant.

Several methods are known for the catalytic alkylation of isoparaffinic hydrocarbons with olefinic hydrocarbons. For instance, it is known to alkylate isoparaffinic hydrocarbons with olefinic hydrocarbons in the presence of sulfuric acid, phosphoric acid, metal phosphates, metal halides, activated clays and the like, as catalysts. In these catalytic alkylation processes, the hydrocarbon reactants form with the alkylation catalysts, a heterogeneous system, during the alkylation operation. Hence these alkylation catalysts may be termed heterogeneous alkylation catalysts. Since under alkylation conditions, the catalytic activity of the alkylation catalysts appears to be predicated upon contact between the catalysts and the gaseous hydrocarbon reactants at the interfaces therebetween, in these processes, the catalysts are used in amounts varying between 10% and 200% by weight, on the charge, depending on the catalyst used. Due to these comparatively high amounts, where possible, recovery and regeneration of the catalysts have been proposed. This, of course, involves high initial and operation costs. Further, it is also known that certain substances called promoters, promote the catalytic activity of these alkylation catalysts. Accordingly, several processes have been proposed wherein small amounts of these promoters, on the order of about 1% to 3% by weight on the charge, are added to the catalysts to promote their alkylation catalytic activity.

A copending application, Serial Number 502,018, filed September 11, 1943, is directed to the process of alkylating normal paraffinic or isoparaffinic hydrocarbons with olefinic hydrocarbons, which comprises contacting a normal paraffinic or isoparaffinic hydrocarbon and an olefinic hydrocarbon in a reaction zone under alkylating conditions, with small or promoter amounts of what has been termed therein, a homogeneous gaseous phase alkylation catalyst consisting essentially of a material that forms with the hydrocarbon reactants, a single homogeneous gaseous phase under the alkylation conditions of the reaction zone. The alkylation conditions of the process of this copending application, comprise a broad temperature range of about 590° F. to about 850° F., preferably, about 650° F. to about 825° F., and pressures of at least 500 pounds per square inch gauge, preferably, pressures of at least 1500 pounds per square inch.

Another copending application, Serial Number 502,813, filed September 17, 1943, is directed to the process of alkylating isobutane with propylene, which comprises contacting isobutane and propylene in a reaction zone under closely controlled alkylating conditions, with promoter or small amounts of the homogeneous gaseous phase catalysts broadly disclosed in the copending application referred to hereinbefore, the closely controlled alkylating conditions including a temperature range of about 750° F. to about 850° F., preferably, about 775° F. to about 825° F., and pressures of at least 2500 pounds per square inch gauge. In the alkylation of isobutane with propylene in the presence of homogeneous gaseous phase alkylation catalysts, it was found that the alkylate obtained included constituents that are entirely different from the constituents of the hydrocarbon alkylate obtained in the alkylation of isobutane with propylene in the presence of known heterogeneous alkylation catalysts, i. e., $AlCl_3$, $H_2SO_4$, and the like. Thus, when heterogeneous alkylation catalysts are used, 2,3-dimethylpentane and 2,4-dimethylpentane are important constituents of the hydrocarbon alkylate obtained. On the other hand, when homogeneous gaseous phase alkylation catalysts are employed, triptane or 2,2,3-trimethylbutane, 2,2-dimethylpentane, and 2-methylhexane may be the predominant constituents of the hydrocarbon alkylate. In this copending application, the formation of these three compounds was postulated as follows:

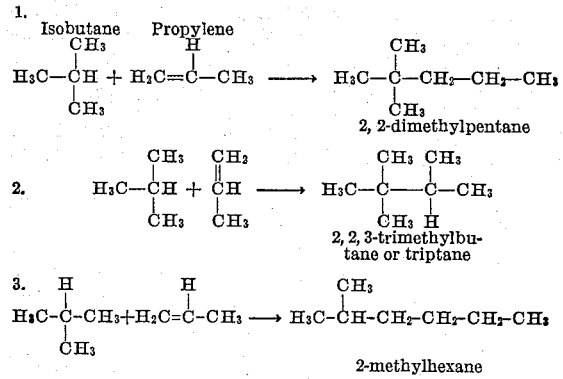

From a motor fuel standpoint, the 2,2-dimethylpentane produced by the first reaction, has an octane number of about 80 CFR motor method; the triptane produced by the second reaction has an octane number of well over 100, and the 2-methylhexane obtained in the third reaction has an octane number of about 45. In view of the foregoing, in the manufacture of high-octane motor fuel by the alkylation of isobutane with propylene, alkylation conditions that favor the production of triptane obviously are preferable. Further, since neohexane which may be produced by the alkylation of isobutane with ethylene, has an octane number of 93.4, and since 2,3-dimethylpentane and 2,4-dimethylpentane which are the predominant constituents of the alkylate obtained in the alkylation of isobutane with propylene in the presence of heterogeneous alkylation catalysts, have octane numbers of 89 and 82, respectively, the importance of the alkylation of isobutane with propylene in the presence of homogeneous gaseous phase alkylation catalysts under alkylation conditions that favor the production of triptane is manifest. It was also found that in actual practice, it was impossible to obtain triptane exclusively, appreciable amounts of 2,2-dimethylpentane and 2-methylhexane being always formed.

The specific classes of homogeneous gaseous phase catalysts disclosed in these copending applications, are organic halogen compounds, and the claims are directed to the use of chlorine and bromine derivatives of acyclic hydrocarbons, as homogeneous gaseous phase alkylation catalysts. Chloroform, chlorinated naphtha, chlorinated butane, carbon tetrachloride, ethylene dibromide, acetyl chloride, propylene dibromide, dibromisobutane, ethyl bromide, propylene tribromide, and tertiary monobromo-butane are among the specific chlorine and bromine derivatives of acyclic hydrocarbons mentioned as suitable homogeneous gaseous phase alkylation catalysts for the alkylation processes disclosed in these copending applications.

The present invention is predicated on the use of organic halogen compounds, generally, as homogeneous gaseous phase alkylation catalysts, in the alkylation of paraffinic hydrocarbons with olefinic hydrocarbons, under the conditions set forth hereinbefore.

Accordingly, it is an object of the present invention to provide an efficient process for alkylating isoparaffinic or normal paraffinic hydrocarbons with olefinic hydrocarbons. Another object is to provide an improved process for catalytically alkylating either normal paraffinic hydrocarbons or isoparaffinic hydrocarbons with olefinic hydrocarbons. A more specific object is to provide a process for catalytically alkylating normally gaseous isoparaffinic hydrocarbons with normally gaseous olefinic hydrocarbons, to produce high yields of high-octane gasoline. A very important object is to afford a process for alkylating isobutane with propylene, to produce high yields of high-octane gasoline. A further object is to provide a process capable of carrying out the above objects by using small amounts of organic halogen compounds, as alkylation catalysts, that form, with the hydrocarbon reactants, a single, homogeneous gaseous phase during the alkylation operation. Other objects and advantages of the present invention will become apparent to those skilled in the art from the following description.

Broadly stated, our invention provides a process for alkylating normal paraffinic or isoparaffinic hydrocarbons, particularly isobutane, with olefinic hydrocarbons, particularly propylene and ethylene, which comprises contacting the paraffinic and olefinic hydrocarbons in gaseous phase and in a reaction zone under alkylating conditions, with small amounts of an alkylation catalyst consisting essentially of one or more organic halogen compounds, that forms with the hydrocarbon reactants, a single, homogeneous gaseous phase under the alkylation conditions of the reaction zone.

An important feature of the process of the present invention is the fact that, contrary to the known catalytic alkylation processes of the prior art which are only capable of alkylating isoparaffinic hydrocarbons, our process is capable of alkylating either normal paraffinic or isoparaffinic hydrocarbons with substantially equal ease.

Another important feature is the relatively low temperature that may be used. As a result, degradation of the hydrocarbon reactants in the charge to low molecular weight hydrocarbons and the pronounced occurrence of side reactions including polymerization of the olefinic hydrocarbons, are substantially completely avoided. Consequently, in our process, we obtain high yields of a high grade product that is almost entirely paraffinic in nature and is substantially free from impurities.

A very important feature of the present invention is the fact that, contrary to known catalytic alkylation processes of the prior art in which the hydrocarbon reactants being processed form with the alkylation catalysts, a heterogeneous system during the alkylation operation, the alkylation process of our invention, employs alkylation catalysts consisting essentially of materials that form with the hydrocarbon reactants being processed, a single homogeneous gaseous phase under alkylating conditions. The alkylation catalysts of the present invention are called, therefore, and as noted hereinbefore, homogeneous gaseous phase alkylation catalysts, in contradistinction to the alkylation catalysts of the prior art which are referred to as heterogeneous alkylation catalysts. Accordingly, as a result of the catalysts' being in the same phase or state as the hydrocarbon reactants being processed, fouling of the catalyst is substantially eliminated and agitation and/or mixing problems are non-extant. Further, since the catalytic activity of alkylation catalysts appears to be predicated somewhat upon contact between the catalysts and the hydrocarbon reactants at the interfaces therebetween, it follows that the catalytic efficiency of a given catalyst increases with the increase in area of interfacial contact, other variables remaining constant. Hence, since the homogeneous gaseous phase alkylation catalysts of our process inherently furnish the greatest possible "interfacial contact" between the catalyst and the hydrocarbon reactants under the conditions of alkylation, efficient catalytic activity with a concomitant high yield of high grade alkylate is achieved using relatively small amounts of homogeneous gaseous phase alkylation catalyst.

In view of the foregoing, an operation feature of the process of the present invention that is of considerable practical importance, is that small or promoter amounts of organic halogen compounds, are used as alkylation catalysts. These amounts are so small that they may be discarded feasibly, thereby obviating recovery and regeneration problems and eliminating high initial and operation costs.

As disclosed in application Serial Number 502,018, filed September 11, 1943; and in application Serial Number 502,813, filed September 17, 1943, a most important feature of homogeneous gaseous phase alkylation is that high yields of high-octane motor fuel are obtained by carrying out the alkylation in the presence of organic halogen compounds.

As disclosed in application Serial Number 502,018, filed September 11, 1943, the organic halogen compounds that are used as homogeneous gaseous phase alkylation catalysts, may be solids, liquids or gases under normal conditions. However, it is likewise essential for the purposes of our process, that the organic halogen compounds that are used as alkylation catalysts in the process of the present invention, form with the hydrocarbon reactants being processed, a single, homogeneous gaseous phase under the alkylation conditions of the reaction zone. Aliphatic or acyclic organic halogen compounds, such as methyl chloracetate, chloral, acetyl bromide, dibromoethyl ether, trifluoroacetic acid, isopropyl fluoride, diiodoethyl ether, isobutyl iodide, iodoform, dibromo-monoiodo methane, and the like; alcicyclic organic halogen compounds, such as fluocyclopropane, bromocyclobutane and iodocyclobutane; and aromatic halogen compounds, such as p-dibromobenzene, benzyl iodide and benzoyl fluoride; have been found to be suitable catalysts for the process of our invention. Generally speaking, the preferred catalysts of our invention, are the halogen derivatives of acyclic, alicyclic and aromatic hydrocarbons, particularly the cheap and readily available low-boiling hydrocarbons, from methane to hydrocarbons with 10 carbon atoms, wherein a halogen or halogens have been substituted for part or all the hydrogen of a hydrocarbon, or into a non-ring portion, if any, of the hydrocarbon. We especially prefer to use as our catalysts, halogen derivatives of low-boiling acyclic hydrocarbons, and the tertiary halogen derivatives of low-boiling acyclic hydrocarbons are among the most desirable, the efficiency of our catalysts apparently being somewhat in proportion to the ease with which they decompose during the alkylation operation. It is understood, of course, that hydrogen halides and elemental halogens, reacting with hydrocarbons, can be used to form the organic halogen compound catalysts in situ.

The amounts of organic halogen compounds used in our process vary between about 0.5% and about 3%, and preferably between about 1% and about 1.25%, with respect to the weight of the total charge of hydrocarbon reactants. It must be noted, however, that larger amounts may be employed if desired, although no additional advantages seem to result therefrom.

The paraffinic and olefinic hydrocarbons to be used in our process may be derived from any suitable source, as is well known in the art, and may be used either in the pure state or in admixture with other constituents not undesirable. The paraffinic and olefinic hydrocarbons usually employed in the preferred operation of manufacturing motor fuels, will be the normally gaseous paraffinic hydrocarbons, except methane and ethane, and the normally gaseous olefinic hydrocarbons, as is well understood in the art. Here again this process has a distinct advantage over many of the prior art processes, in that the olefin ethylene may be used for alkylating the paraffinic hydrocarbons. It is well known that ethylene cannot be used in many catalytic processes, including the sulfuric acid process, whereby the supply of available olefinic hydrocarbons is restricted. Therefore, an important aspect of the present invention is the fact that butane, for instance, may be alkylated with ethylene.

A conventional and preferred source of paraffinic and olefinic hydrocarbons is the fixed gases obtained around petroleum refineries. These fixed gases may furnish substantially all the desired paraffinic and olefinic hydrocarbons, or it may be necessary or desirable to obtain additional supplies, as is well understood. Additional olefinic hydrocarbons, if required, may be formed from a portion of the paraffinic hydrocarbons. On the other hand, additional paraffinic hydrocarbons may be admixed to increase the concentration of paraffinic hydrocarbons to a desired magnitude.

In carrying out our process, we use temperatures varying between about 590° F. and about 850° F., and preferably temperatures varying between about 650° F. and about 825° F. In the alkylation of isobutane with propylene, however, it was found, as disclosed in copending application Serial Number 502,813, filed September 17, 1943, that the best yields of desired alkylate are obtained when the alkylation is conducted at temperatures falling within about 750° F. to about 850° F., and preferably, about 775° F. to about 825° F. The alkylate produced under these conditions contains no more than 5% of olefinic hydrocarbons and no aromatics so that the predominance of alkylation obtained thereby is a distinct feature of the process. Under appreciably higher temperature conditions, secondary reactions occur that substantially reduce the purity of the product obtained, as noted hereinbefore in connection with thermal alkylation. In the alkylation of isobutane with propylene in accordance with the process of the present invention, it must be noted that even within the preferred temperature range, side reactions occur that account for substantial portions of the total alkylate, but a fraction boiling at 79° C. to 82° C. and consisting of 15 parts of triptane to 85 parts of 2,2-dimethylpentane may be obtained.

The pressure to be used in our process may vary from about 500 pounds per square inch to about 6000 pounds per square inch or more, and preferably from about 2500 pounds per square inch to about 6000 pounds per square inch for the alkylation of isobutane with propylene, the most suitable pressure being more or less dependent upon the particular temperature involved. In general, the higher the pressure, the higher the yield of alkylate. Accordingly, the criterion for establishing an upper limit to the pressure range used is primarily the feasibility of maintaining such pressure.

The process may be carried out as a batch, continuous or semi-continuous type of operation. Particularly when the process is carried out on a commercial scale, economic considerations make it preferable to operate in a continuous manner. For efficient operation, whether the process is carried out on a batch or continuous basis, it is essential that the hydrocarbon reactants be intimately contacted with the homogeneous gaseous phase catalysts of our invention. This may be effected in several ways, as is well known in the art.

In our process it is desirable, as in known isoparaffin-olefin alkylation processes, to keep the concentration of the olefinic hydrocarbons relatively low during the alkylation reaction, in order to eliminate as much olefin polymerization as possible. Accordingly, it is advisable to maintain the olefin concentration in the charge below about 25% by volume, and preferably between about 7% and about 12% by volume. In continuous operation, this is effected by introducing the olefinic reactant at a number of points in the reaction zone or by adding the olefinic reactant to a recirculating mass of excess paraffinic hydrocarbon reactant, reaction product and catalyst.

The reaction period during which the reactants are present in the reaction zone depends upon the temperature, and to a certain extent, upon the pressure. Ordinarily, a reaction period varying between 1 to 2 minutes and 1 to 2 hours is satisfactory.

It must be understood, that the reaction variables are more or less interdependent, hence, when one is arbitrarily fixed, the limits within which the others may be varied, are somewhat restricted. In any particular instance, the most desirable conditions can be readily ascertained by one skilled in the art, the preferred ranges of these variables having been indicated hereinbefore.

The alkylate product that we obtain distills over a fairly large boiling range, but a greater part of the alkylate, usually from about 85% to about 90%, distills in the boiling range of aviation gasolines. The iodine number of the aviation distillate is low, on the order of about 5 to 10. As mentioned hereinbefore, the alkylate product consists predominantly of branched paraffinic hydrocarbons.

Numerous experimental data could be adduced to indicate the results obtainable by employing the homogeneous gaseous phase catalysts of the present invention, but the following examples are sufficiently characteristic:

|  | Run 1 | Run 2 | Run 3 | Run 4 |
|---|---|---|---|---|
| Per cent by weight of isobutane in charge | 89.5 | 88.6 | 92.82 | 88.9. |
| Per cent by weight of propylene in charge | 10.0 | 10.0 |  | 9.9. |
| Per cent by weight of ethylene in charge |  |  | 5.6 |  |
| Catalyst | Dichloro ethyl ether | Isobutyl iodide | p-Dibromobenzene | Isopropyl fluoride. |
| Per cent of catalyst by weight | 0.5 | 1.4 | 1.58 | 1.2. |
| Contact time in minutes | 37 | 24 |  | 24. |
| Residence time in minutes |  |  | 10.6 |  |
| Temperature, ° F | 800 | 800 | 853 | 800. |
| Pressure, lbs./sq. in. gauge | 5000 | 6000 | 2500 | 6000. |
| Per cent yield of alkylate based on weight of olefine | 133 | 86 | 156 | 134. |
| Per cent yield of alkylate based on weight of charge | 13.3 | 8.8 | 8.7 | 13.3. |
| Per cent triptane in 76–86° C. fraction of alkylate | 10 | 11 |  | 11. |
| Per cent neohexane fraction (44–54° C.) in alkylate |  |  | 54.3 |  |

The alkylate produced by our process is contaminated by various halogen compounds which are present in small concentration. These compounds cause a negative susceptibility to tetraethyl lead, and therefore, should be removed. Removal of the halogen compounds is possible in a variety of ways, as set forth in copending applications Serial Number 477,450, filed February 27, 1943; Serial Number 502,504, filed September 15, 1943; and Serial Number 504,436, filed September 30, 1943.

This application is a continuation-in-part of our copending application Serial Number 502,018, filed September 11, 1943.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

We claim:

1. The process of manufacturing triptane, which comprises contacting isobutane and propylene in gaseous phase in a reaction zone under alkylating conditions including a temperature varying between about 775° F. and about 825° F. and a pressure in excess of 2500 pounds per square inch, with an alkylation catalyst consisting essentially of material selected from the group consisting of acylic organic halogen compounds, alicyclic organic halogen compounds, and aromatic organic halogen compounds, that forms with said isobutane and said propylene, a single, homogeneous gaseous phase under said alkylating conditions, in amounts of at least about 0.5% by weight based on the total weight of said isobutane and said propylene, and maintaining said isobutane in excess over said propylene in said reaction zone so that alkylation is the principal reaction.

2. The process of claim 1 wherein the alkylation catalyst consists essentially of a halogen derivative of a hydrocarbon.

3. The process of claim 1 wherein the alkylation catalyst consists essentially of a halogen derivative of a low-boiling hydrocarbon.

4. The process of claim 1 wherein the alkylation catalyst consists essentially of a fluorine derivative of a low-boiling acylic hydrocarbon.

5. The process of claim 1 wherein the alkylation catalyst consists essentially of an iodine derivative of a low-boiling acylic hydrocarbon.

6. The process of manufacturing high-octane gasoline, which comprises contacting isobutane and propylene in gaseous phase in a reaction zone under alkylating conditions including a temperature varying between about 750° F. and about 850° F. and a pressure in excess of 2500 pounds per square inch, with an alkylation catalyst consisting essentially of material selected from the group consisting of acyclic organic halogen compounds, alicyclic organic halogen compounds, and aromatic organic halogen compounds, that forms with said isobutane and said propylene, a single, homogeneous gaseous phase under said alkylating conditions, and maintaining said isobutane in excess over said propylene in said reaction zone so that alkylation is the principal reaction.

7. The process of claim 6 wherein the alkylation catalyst consists essentially of a halogen derivative of a hydrocarbon.

8. The process of claim 6 wherein the alkylation catalyst consists essentially of a halogen derivative of a low-boiling hydrocarbon.

9. The process of claim 6 wherein the alkylation catalyst consists essentially of a fluorine derivative of a low-boiling acyclic hydrocarbon.

10. The process of claim 6 wherein the alkylation catalyst consists essentially of an iodine derivative of a low-boiling acyclic hydrocarbon.

11. The process of manufacturing high-octane gasoline, which comprises contacting a normally gaseous paraffinic hydrocarbon and a normally gaseous olefinic hydrocarbon in gaseous phase in a reaction zone under alkylating conditions including a temperature varying between about 650° F. and about 825° F. and a pressure in excess of 1500 pounds per square inch, with an alkylation catalyst consisting essentially of material selected from the group consisting of acyclic organic halogen compounds, alicyclic organic halogen compounds, and aromatic organic halogen compounds, that forms with said normally gaseous paraffinic hydrocarbon and said normally gaseous olefinic hydrocarbon, a single, homogeneous gaseous phase under said alkylating conditions, in amounts of at least about 0.5% by weight based on the total weight of said normally gaseous paraffinic hydrocarbon and said normally gaseous olefinic hydrocarbon, and maintaining said normally gaseous paraffinic hydrocarbon in excess over said normally gaseous olefinic hydrocarbon in said reaction zone so that alkylation is the principal reaction.

12. The process of claim 11 wherein the alkylation catalyst consists essentially of a halogen derivative of a hydrocarbon.

13. The process of claim 11 wherein the alkylation catalyst consists essentially of a halogen derivative of a low-boiling hydrocarbon.

14. The process of claim 11 wherein the alkylation catalyst consists essentially of a fluorine derivative of a low-boiling acyclic hydrocarbon.

15. The process of claim 11 wherein the alkylation catalyst consists essentially of an iodine derivative of a low-boiling acyclic hydrocarbon.

16. In a process of alkylating a paraffinic hydrocarbon with an olefinic hydrocarbon, which includes reacting a paraffinic hydrocarbon with an olefinic hydrocarbon in a reaction zone under alkylating conditions, in the presence of an alkylation catalyst; the improvement which comprises contacting said paraffinic hydrocarbon and said olefinic hydrocarbon in gaseous phase in a reaction zone under alkylating conditions including a temperature varying between about 590° F. and about 850° F. and a pressure in excess of 500 pounds per square inch, with an alkylation catalyst consisting essentially of material selected from the group consisting of acyclic organic halogen compounds, alicyclic organic halogen compounds, and aromatic organic halogen compounds, that forms with said paraffinic hydrocarbon and said olefinic hydrocarbon, a single, homogeneous gaseous phase under said alkylating conditions, and maintaining said paraffinic hydrocarbon in excess over said olefinic hydrocarbon in said reaction zone so that alkylation is the principal reaction.

17. The process of claim 16 wherein the alkylation catalyst consists essentially of a halogen derivative of a hydrocarbon.

18. The process of claim 16 wherein the alkylation catalyst consists essentially of a halogen derivative of a low-boiling hydrocarbon.

19. In the process of alkylating a paraffinic hydrocarbon with an olefinic hydrocarbon, which includes reacting a paraffinic hydrocarbon with an olefinic hydrocarbon in a reaction zone under alkylating conditions, in the presence of an alkylation catalyst; the improvement which comprises contacting said paraffinic hydrocarbon and said olefinic hydrocarbon in gaseous phase in a reaction zone under alkylating conditions, with an alkylation catalyst consisting essentially of a fluorine derivative of a low-boiling acyclic hydrocarbon, that forms with said paraffinic hydrocarbon and said olefinic hydrocarbon, a single, homogeneous gaseous phase under said alkylating conditions, and maintaining said paraffinic hydrocarbon in excess over said olefinic hydrocarbon in said reaction zone so that alkylation is the principal reaction.

20. The process of claim 19 wherein the alkylation catalyst consists essentially of an iodine derivative of a low-boiling acyclic hydrocarbon.

ALEXANDER N. SACHANEN.
ARLIE A. O'KELLY.
CLAUDE G. MYERS.